(12) United States Patent
Herp et al.

(10) Patent No.: US 7,264,318 B2
(45) Date of Patent: Sep. 4, 2007

(54) BRAKE PRESSURE CONTROL ARRANGEMENT

(75) Inventors: Andreas Herp, Ehningen (DE); Michael Schopfer, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 119 days.

(21) Appl. No.: 11/043,698

(22) Filed: Jan. 26, 2005

(65) Prior Publication Data

US 2005/0258684 A1    Nov. 24, 2005

Related U.S. Application Data

(63) Continuation-in-part of application No. PCT/EP03/07548, filed on Jul. 11, 2003.

(30) Foreign Application Priority Data

Jul. 27, 2002 (DE) .............................. 102 34 366.7

(51) Int. Cl.
*B60T 13/18* (2006.01)
(52) U.S. Cl. .................. 303/11; 303/113.2; 303/116.2; 303/115.4
(58) Field of Classification Search .................. 303/11, 303/116.2, 116.1, 113.1, 114.1, 115.4, 140, 303/146, 119.1, 113.5, 9.62, 186, 113.2
See application file for complete search history.

(56) References Cited

U.S. PATENT DOCUMENTS

| | | | | |
|---|---|---|---|---|
| 5,131,730 A | * | 7/1992 | Kollers et al. | 303/113.2 |
| 5,195,809 A | * | 3/1993 | Burgdorf | 303/113.2 |
| 5,205,623 A | * | 4/1993 | Holzmann et al. | 303/113.2 |
| 5,236,256 A | * | 8/1993 | Schmidt et al. | 303/113.2 |
| 5,281,012 A | * | 1/1994 | Binder et al. | 303/113.5 |
| 6,142,583 A | * | 11/2000 | Steffes | 303/114.1 |
| 6,273,525 B1 | * | 8/2001 | Erban et al. | 303/11 |
| 6,419,329 B1 | * | 7/2002 | Buschmann et al. | 303/113.1 |
| 6,752,473 B2 | * | 6/2004 | Yang | 303/116.2 |

FOREIGN PATENT DOCUMENTS

| | | |
|---|---|---|
| DE | 44 38 721 | 5/1996 |
| DE | 4438721 A1 * | 5/1996 |
| DE | 195 01 760 | 7/1996 |
| DE | 197 16 404 | 10/1998 |
| DE | 197 56 248 | 7/1999 |
| DE | 199 39 437 | 10/2000 |
| EP | 0 841 231 | 5/1998 |

(Continued)

*Primary Examiner*—Devon C. Kramer
*Assistant Examiner*—Mariano Sy
(74) *Attorney, Agent, or Firm*—Klaus J. Bach

(57) ABSTRACT

In a method for joining at least two work pieces by friction stir welding wherein the work pieces are placed placed in overlapping relationship and are at least partially plasticized in the area where they are to be joined by a rotating friction tool provided with a pin-like projection which is moved axially into the area of the joint to be formed, the projection on the rotating tool has a length corresponding about to the thickness of the upper work piece and a shoulder around the pin-like projection so that, upon movement of the tool toward the work pieces, the work piece material is plasticized by the rotating pin-like projection which moves axially into the work piece material until it reaches the surfaces of the lowermost workpiece.

6 Claims, 2 Drawing Sheets

FOREIGN PATENT DOCUMENTS

| | | |
|---|---|---|
| WO | WO94/27848 | 12/1994 |
| WO | WO96/10507 | 4/1996 |
| WO | WO97/10980 | 3/1997 |
| WO | WO97/47504 | 12/1997 |
| WO | WO98/31576 | 7/1998 |
| WO | 198 55 667 | 8/1999 |

* cited by examiner

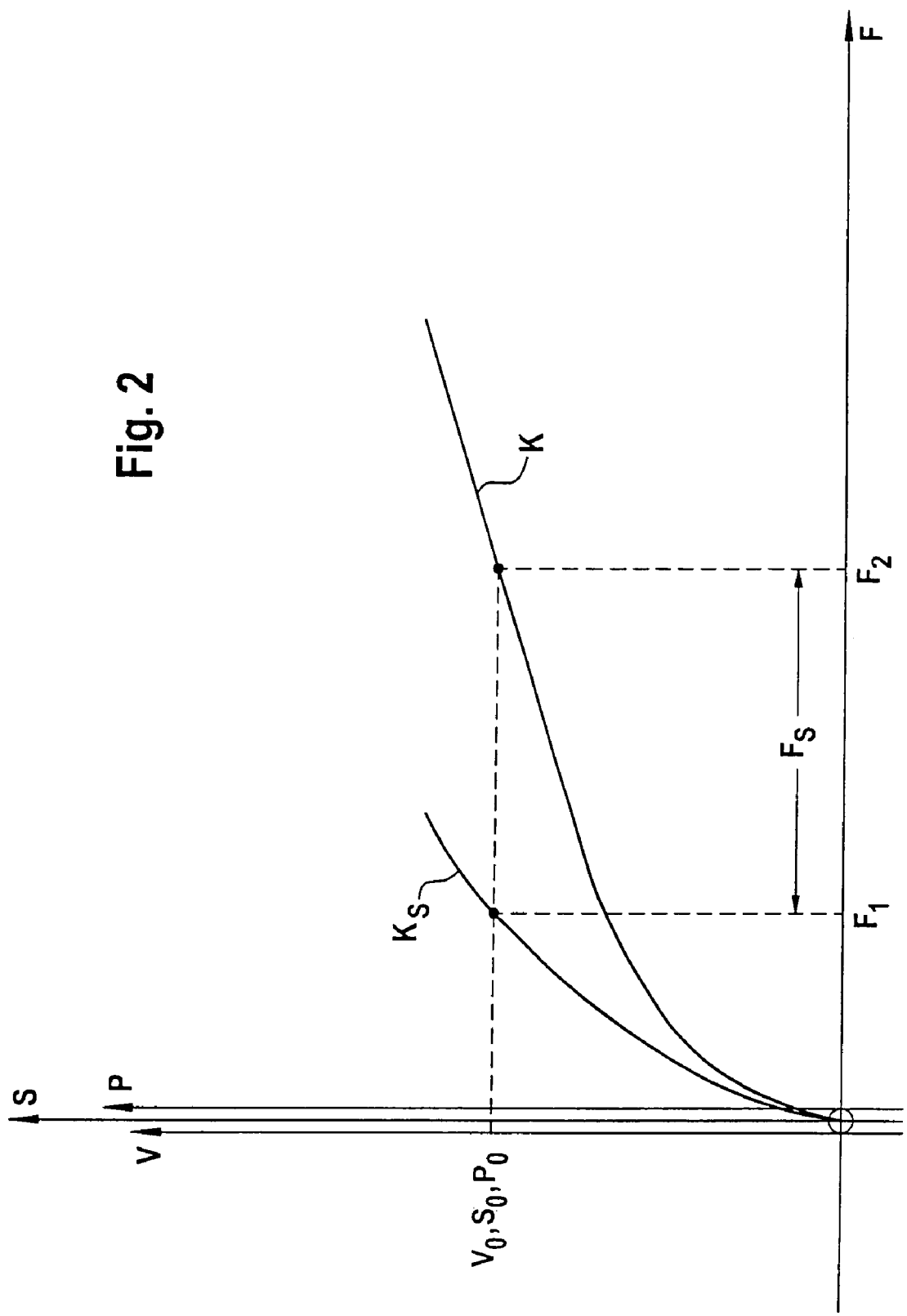

BRAKE PRESSURE CONTROL ARRANGEMENT

This is a Continuation-In-Part Application of International Application PCT/EP2003/007548 filed Jul. 11, 2003 and claiming the priority of German application 102 34 366.7 filed Jul. 27, 2002.

BACKGROUND OF THE INVENTION

The invention relates to a brake pressure control arrangement with an ABS and/or an ESP function for operating the brakes of a motor vehicle including pump units serving as boosters for the ABS and ESP functions and for the driver-initiated braking.

The arrangement comprises a hydraulic actuating device and a hydraulic receiver unit which is in communication with the hydraulic actuating device for operating the wheel brakes of the motor vehicle, and at least one pump unit which, by means of an automatic control device and control valves operated thereby, can be placed, when the hydraulic actuating device is actuated, in intervals into a first effective operating state wherein the receiver unit is, for pressure release, in communication with the suction side of the pump unit and into a normal operating state, wherein the receiver unit is in communication with the pressure side of the pump unit while the suction side of the pump unit is connected to the hydraulic actuating device. The hydraulic pressure at the hydraulic receiver is determined by the hydraulic fluid volume supplied to the hydraulic receiver unit, and a suction flow control valve is arranged between the actuating device and the pump and controlled by an automatic brake control arrangement.

Such a braking pressure control arrangement is the subject of DE 199 39 437 A1. This braking pressure control arrangement makes it possible with the use of a pump unit to provide for the receiver units hydraulic pressures which are substantially higher than the pressures generated by the hydraulic actuating device, that is, the pump is used as a pressure amplifier.

The first pump-effective operating state serves to rapidly reduce the pressure at a hydraulic receiver if a wheel blocks during a braking procedure, so that the wheel is again rotated and can transmit correspondingly higher side guide forces. The first pump-effective operating state is consequently mainly used for the anti-blocking control of vehicle wheels.

Furthermore, with the brake pressure control arrangement according to DE 199 39 437 A1 also a drive wheel slip control can be provided. In this case, the pump unit can be controlled at intervals, when the actuating device is not operated in a second pump-effective state wherein the hydraulic receiver units are placed in communication with the pressure side of the pump unit. A spinning wheel can, in this way, be braked down.

DE 199 39 437 A1 discloses a brake pressure control arrangement wherein a pressure limit valve is arranged between the pressure side of the pump unit and the hydraulic actuating device, which pressure limit valve is controlled by a piston arrangement depending on the pressure provided by the hydraulic actuating device, that is, the hydraulic actuating device pressure determines the maximum pressure provided at the pressure side pump unit.

For this reason, the pressure limiting valve must be arranged in series with a shut-off valve which is operated by the control arrangement if the driving wheel slip control mentioned earlier is to be ensured. During driving wheel slip control the shut-off valve is automatically closed, so that, at the receiver units or, respectively, the pressure side of the pump unit, a high pressure can be provided although the pressure limit valve has only a very small opening pressure when the actuating unit is not operated that is the pressure supplied by the actuating unit is very small.

DE 197 56 248 A1 discloses for example a brake pressure control system wherein the vacuum generated in the internal combustion engine of a motor vehicle is utilized for generating the auxiliary forces. This arrangement also permits the generation of high hydraulic pressures for actuating the vehicle brakes with comparably small actuating forces applied by an operator.

DE 197 16 404 C1 discloses another possibility to generate at the receiver units a hydraulic pressure which is high in comparison with the operating force applied at the actuating unit. In accordance with this publication, the actuating unit includes a stepped piston which, with a first piston area is disposed in a first operating cylinder and with a second piston area is disposed in a second cylinder for the displacement of the hydraulic fluid therein. Both cylinders are in communication in parallel with respective receiver units of the wheel brakes (wheel cylinders) wherein a pump can be provided in the communication lines between the two cylinders in such a way that the pressure in one of the cylinders can be reduced. In this way, the actuating force applied by the operator is mainly effective as a high pressure in the other cylinder, that is, the actuating force is transmitted to a relatively small piston area so that a relatively high hydraulic pressure is generated in the receiver units generating a high brake force.

It is the object of the present invention to provide a brake pressure system of the type initially described however of a more simple design.

SUMMARY OF THE INVENTION

In a brake pressure control arrangement with at least one of an ABS function and an ESP function wherein pump units are provided as pressure boosters, the pressure of the hydraulic fluid supplied to the receiver units depends on the hydraulic fluid volume supplied to the receiver units by controlling the intake flow control valve for the admission of hydraulic fluid to the pump and, in other operating states, the pump and valves are operated to alternately supply hydraulic fluid to, and receive hydraulic fluid from, the receiver units.

With the arrangement according to the present invention, the pressure limit valve provided in DE 199 39 437 A1 and the piston arrangement for the control thereof, which is controlled by the pressure provided by the hydraulic actuating device and the pressure at the pressure side of the pump unit, is not needed. Instead, the pressure is limited by a valve which is operated by the control arrangement with the result that the control arrangement alone determines the maximum pressure at the pressure side of the pump unit. In this way, the behavior of the control arrangement is particularly accurate and reproducible.

Essentially, the control arrangement must only be in a position to control the pump unit depending on the operating parameters of the actuating device for example deciding on the control stroke of the actuating device or the hydraulic pressure generated by the actuating device.

In a particularly advantageous embodiment, the suction flow control valve may be in the form of an over-pressure valve subjected to the opposite hydraulic pressure in opening direction. Such a controllable over-pressure valve controls the supply flow from the pump unit like a suction throttle and, consequently, the achievable hydraulic pressure at the pressure side of the pump unit, that is, the receiver side hydraulic pressure and, accordingly, the brake forces for the wheel brakes.

The invention will be described below in greater detail on the basis of the accompanying drawings.

BRIEF DESCRIPTION OF THE DRAWINGS

FIG. 2 shows a diagram of the control behavior of the arrangement.

DESCRIPTION OF A PREFERRED EMBODIMENT

Figure 1:
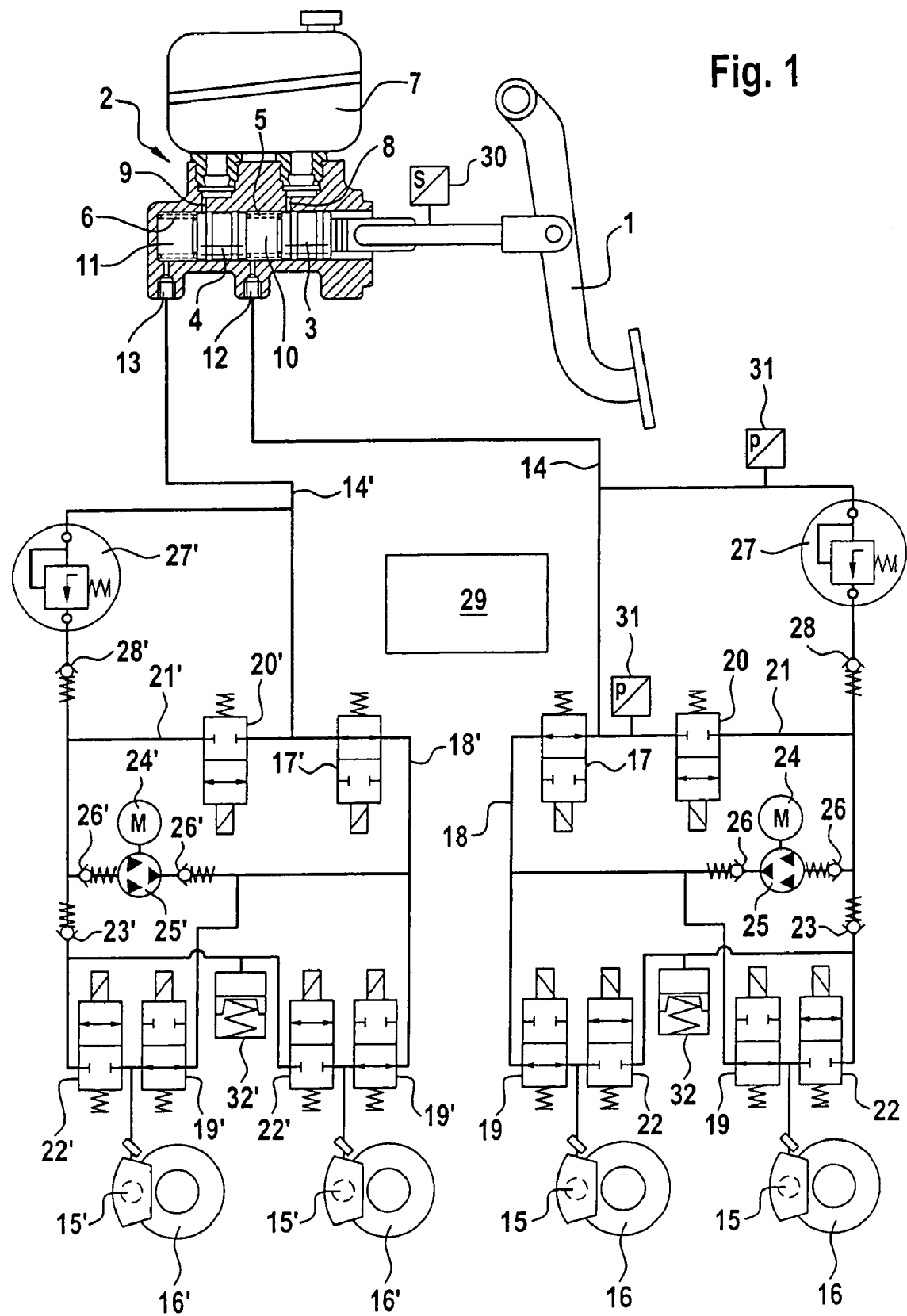
FIG. 1 shows a brake pressure control arrangement in accordance with the invention.

As shown in FIG. 1, the brake pressure control arrangement includes, in a basically known manner, a hydraulic actuating device 2 with a brake pedal 1, the hydraulic actuating device 2 being a two-circuit device. The hydraulic actuating device 2 includes a housing with a cylinder in which two pistons 3 and 4 are serially arranged, one after the other. The piston 3 is mechanically coupled to the brake pedal 1. The piston 4 is a floating piston, which is supported at its front end by a compression spring 6 on the front end wall of the cylinder and, at its opposite side by a compression spring 5 on the front end of the piston 3. The springs 6 and 5 bias the pistons 4 on 3 and, accordingly, the pedal 1 in a rest position in which a hydraulic fluid reservoir 7 disposed on the actuating device 2 is in communication, via bores 8 and 9, with the piston operating chambers 10 and 11 shown in FIG. 1 axially at the left front ends of the pistons 3 and 4. Each piston operating chamber includes an outlet 12 and respectively 13, which is shown in FIG. 1 displaced to the left with respect to the bores 8 and, respectively, 9.

Connected to the outlets 12 and 13 are communication lines 14 and 14' by way of which the piston operating chambers 10 and 11 are in communication with the receiver units 15 and 15' (wheel cylinders) of the front wheel brakes 16 and the rear wheel brakes 16' of the vehicle.

Each communication line 14 or, respectively, 14' is connected to a line 18 or, respectively 18' by way of a normally open shut-off valve 17, or respectively 17', and the lines 18, 18' are connected via normally open shut off valves 19, 19' to the receiver units 15 and 15' respectively.

Furthermore, the connecting lines 14, 14' are connected by way of normally closed shut off valves 20, 20' to the lines 21 and respectively 21', which are in communication, by way of normally closed shut off valves 22, 22' that are arranged parallel to the valve 19 and, respectively, 19', with the receiver units 15 and, respectively, 15'. The lines 21, 21' include one-way valves 23, 23' which permit only a hydraulic fluid return flow from the receiver units 15 and respectively 15' when the valves 22 and 22' are open.

Between the lines 18 and 21 and respectively 18' and 21' pumps 25 and respectively 25' driven by electric motors 25 and, respectively, 25' are arranged together with check valves 26 and respectively, 26' in such a way that hydraulic fluid can only flow from the line 21 or respectively 21' to the line 18 or respectively 18'.

Parallel to the shutoff valves 20 and 20' controllable over-pressure valves 27 and respectively 27' with serially arranged check valves 28, 28' are provided such that, with the respective over-pressure valves 27, 27' opened, hydraulic fluid flow is possible only from the line 14 or, respectively, 14' to the line 21 or, respectively, 21'.

All the above control valves are operated by an electronic control unit 29. The electronic control unit 29 is connected to a travel distance sensor 30 for determining the actuating position of the brake pedal 1 and/or the pressure sensors 31 for determining a characteristic hydraulic fluid pressure at the output side of the hydraulic actuating unit 2.

Otherwise, the input side of the control unit 29 is connected to wheel sensors of the vehicle which however are not shown but which provide information concerning wheel speed or wheel blockage conditions for the respective wheels.

The system as shown in FIG. 1 operates as follows:

If a fault is detected in the system by the control unit 29 which constantly checks itself for faults, all valves assume the switch positions as shown in FIG. 1 and the electric motors 24 and 24' of the pumps 25 and 25' are de-energized. However, this state of the valves and the electric motors may also be present when the brakes 16 and, respectively, 16' are expected to provide only comparatively small brake forces. If the brake pedal 1 is operated in this state of the system, the pistons 3 and 4 are moved beyond the bores 8 and 9, so that the piston operating chambers 10 and 11 are disconnected from the reservoir 7 and, upon further actuation of the brake pedal 1, hydraulic fluid is directed from the piston operating chambers 10 and 11 into the lines 14 and 14', respectively of the wheel brakes 16 and 16' and the brakes are actuated to brake the wheels. As soon as the brake pedal 1 is released, the pistons 3 and 4 and the brake pedal 1 are returned by the springs 5 and 6 to their rest positions in which the receiver unit 15 and 15' in the switch positions of the valves as shown are in communication with the reservoir 7 and consequently not under pressure. No brake effect is therefore present at the wheel brakes 16 and, respectively 16'.

Under normal operation of the control unit 29, the shutoff valves 17, 17' are closed when the brake pedal 1 is actuated. Further, the valves 19, 20 and 22 or, respectively, the valves 19', 20', and 22' are in the positions shown in FIG. 1. The over-pressure valves 27 and 27' are controlled by the control unit 29 depending on the signals of the travel distance sensor 30 and/or the pressure sensor 31, such that, with predetermined controllable pressures in the lines 14 and, respectively, 14', they are opened and the pumps 25, and respectively, 25' suck in a certain hydraulic fluid volume by way of the over-pressure valves 27 and, respectively, 27' from the communication lines 14 and respectively 14' and supply it, by way of the valves 19 and respectively 27', from the communication lines 14 and respectively 14' by way of the valves 19 and respectively 19' to the receiver units 15 and, respectively 15' of the wheel brakes 16 and, respectively, 16' and there, generate a hydraulic pressure depending on the amount of the hydraulic fluid supplied. This hydraulic pressure at the receiver side may be substantially above the hydraulic fluid pressure in the communication lines 14 and, respectively, 14'.

The hydraulic fluid volume which is supplied by the pumps 25, 25' to the receiver units 15 and 15' and which determines the hydraulic pressure therein is determined by the overpressure valves 27, and respectively, 27' whose opening behavior is controlled by the control unit 29. The over-pressure valves 27 and 27' act with respect to the pump 25 and 25' like intake throttles.

When, during normal operation, that is, with an operative control unit 29, the brake pedal is released, the valves 22 and 20 and respectively 22' and 20' are opened so that the hydraulic fluid can flow back from the receiver units 15 and, respectively, 15' to the actuating unit 2, wherein possible pressure pulses are attenuated by hydraulic pulsation dampers 32, and respectively, 32', which are in communication with the outlet side of the valves 22 and respectively 22'.

During normal operation, the pump 25 and respectively 25' may be constantly energized if, with the brake pedal 1 not actuated, the valves 19 and 22 and, respectively, 19' and 22' and/or the valves 17 and 20, and respectively, 17' and 20' are constantly open and, accordingly permit hydraulic fluid circulation by the pump 25 and 25'.

In order to make the ABS function possible during braking, that is, in order to cause the release of a braked wheel that has locked, the control unit 29 can selectively open the valves 22 and, respectively, 22' and, at the same time, the valves 17 and respectively 17' so that the pump 25 and respectively 25', can pump hydraulic fluid from the receiver unit 15, 15' associated with the open valves 22, 22' back to the actuating unit 2. The valves 22 and 17, and, respectively, 22' and 17' are opened in intervals in order to release the respective blocked wheel in intervals in order to then again be able to effectively brake the wheel.

When for an ESP function, a wheel is to be selectively braked (with the brake pedal 1 not actuated), hydraulic fluid is supplied by the respective pump 25 or, respectively 25' to the respective receiver unit 15 or 15' of the wheel brakes 16, 16'. To this end, the shut-off valve 20 or, respectively, 20' and the shut off valves 19, or respectively 19', associated with the respective receiver unit is opened while at the same time the respective blocking valve 22, 22' is closed, so that the respective pump 25, 25' supplies hydraulic fluid to the respective receiver unit 15 or 15' with a corresponding pressure which subsequently is again reduced by opening of the shutoff valve 22, 22'.

FIG. 2 shows the operational behavior of the brake pressure control arrangement according to the invention.

In the diagram of FIG. 2, the stroke S of the brake pedal, the volume V of the hydraulic medium displaced during brake pedal actuation from the piston operating chambers 10 and 11 and the pressure P in the receiver units as shown depending on the operating force F applied to the brake pedal 1. The values S, V and P are functionally equally dependent on the actuating force F since the stroke S of the pedal 1 correlates vice versa directly to the hydraulic volume displaced by the piston 3 and 4, and the hydraulic fluid volume displaced from the actuating device 2 is reversibly directly related to the pressure P in the receiver units.

During an emergency operation, in accordance with the curve K, a comparatively large brake pedal force $F_2$ is required in order to achieve a pedal stroke $S_0$ or the discharge of a hydraulic fluid volume $V_0$ from the actuating unit or, respectively, to achieve a hydraulic pressure $P_0$ in the receivers.

During normal operation however, the pumps 25 and respectively 25', assist the transport of hydraulic fluid from the actuating unit 2 to the receiver units 15, 15' upon actuation of the brake pedal 1, so that a pedal force of only $F_1$ is required to achieve the stroke $S_0$, the receiver unit pressure $P_0$ or, respectively, a displacement movement of the hydraulic volume $V_0$ to the receiver units 15 and 15' respectively. The curve $K_s$ shows the functional relationship in an exemplary way. The difference $F_2-F_1=F_s$ represents the power assist effect of the pump 25 and, respectively 25'.

What is claimed is:

1. A brake pressure control arrangement for a hydraulic vehicle braking system of a vehicle having wheels with brakes, comprising:
a hydraulic actuating unit (2) actuatable by an operator of the vehicle, receiver units (15, 15') in communication with the hydraulic actuating unit for operating the brakes (16, 16') of the wheels, at least one pump unit (25, 25') connected to the receiver units (15, 15') via a communication line (18, 18') including control valves (19, 19', 22, 22') for controlling admission of hydraulic fluid to, and its release from, the receiver units (15, 15'), an intake flow control valve (27, 27') arranged between the actuating unit (2) and the pump unit (25, 25'), the intake flow control valve (27, 27') being an overpressure valve subjected to the pressure of the actuating unit (2) in an opening direction and having a controllable opening pressure behavior, and a control unit (29) for controlling the control valves and the intake flow control valve in such a way that, with the actuating unit (2) actuated, in a first operating state, the receiver units are, in intervals, connected only to the suction side of the pump unit (25, 25') so as to reduce the hydraulic pressure therein, and, in a second operating state, the receiver units (15, 15') are connected to the pressure side of the pump unit (25, 25') for supplying pressurized hydraulic fluid to the receiver units (15, 15') and the pump suction side is in communication with the actuating unit (2) such that the hydraulic fluid volume supplied to the receiver unit is determined solely by the intake flow volume of the receiver unit (15, 15') as provided by the pump unit (25, 25') and, with the actuating unit not operated, in a third operating state, the pump unit (25, 25') is connected with its intake side to the actuating unit and with its pressure side to the receiver unit (15, 15'), and a normally closed shutoff valve (20, 20'), which is arranged parallel to the intake flow control valve (27, 27') in a circuit branch extending between the actuating unit (2) and the intake side of the pump unit (25, 25') and which, in the third operating state, is opened by the control unit (29).

2. A brake pressure control arrangement according to claim 1, wherein, in the third operating state, the pump unit (25, 25') is switchable—in intervals—to its pump-effective operating state.

3. A brake pressure control arrangement according to claim 1, wherein, in the second operating state, the control unit (29) operates depending on the pressure generated by the actuating unit (2).

4. A brake pressure control arrangement according to claim 1, wherein the control unit is effective as a controller providing for operation of the pump unit (25, 25') and, respectively, the intake flow control valve (27, 27') depending on a desired and actual value comparison of the receiver side hydraulic pressure, wherein the desired value of the hydraulic fluid pressure is predetermined by an actuating-side operating parameter.

5. A brake pressure control arrangement according to claim 4, wherein the desired value is determined by at least one of an operating stroke length of the actuating unit (2) and an actuating side hydraulic pressure.

6. A brake pressure control arrangement according to claim 1, wherein the pump unit (25, 25') is combined with control valves (17, 17' 19, 19', 20, 20' 22, 22', 27, 27') in such a way that the pump operation is selectively switched between a circulation operation or a pumping operation with a hydraulic fluid supply flow from the actuating unit (2) to the receiver units (15, 15') and a pump operation with a hydraulic fluid flow from one of the receiver units (15, 15') to the actuating unit (2).

* * * * *